Sept. 2, 1958  J. M. MUNRO  2,850,317
AUTOMATICALLY RELEASING SWIVEL COUPLING
Filed May 7, 1953  3 Sheets-Sheet 1

INVENTOR.
JAMES M. MUNRO
BY
*C. D. O'Brien*
*V. C. Muller*
ATTORNEYS

Sept. 2, 1958            J. M. MUNRO            2,850,317
AUTOMATICALLY RELEASING SWIVEL COUPLING
Filed May 7, 1953                             3 Sheets-Sheet 2
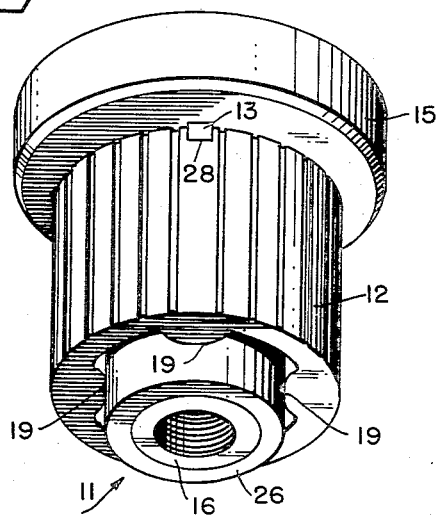
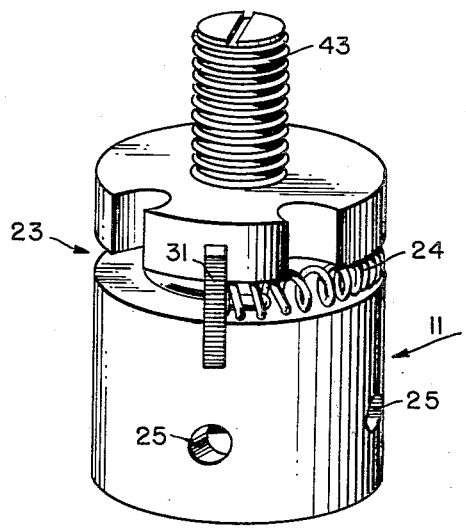
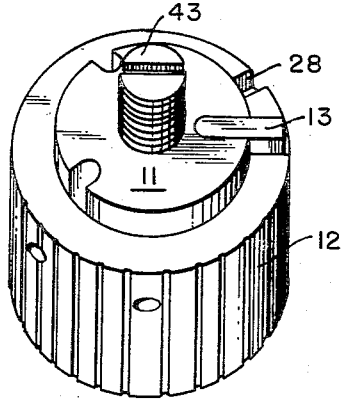
INVENTOR.
JAMES M. MUNRO
BY
ATTORNEYS

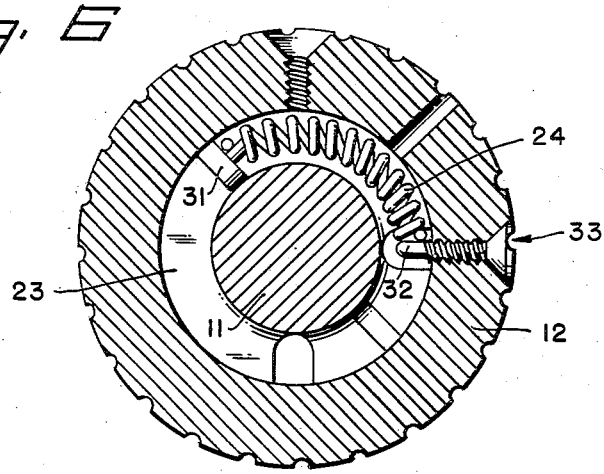
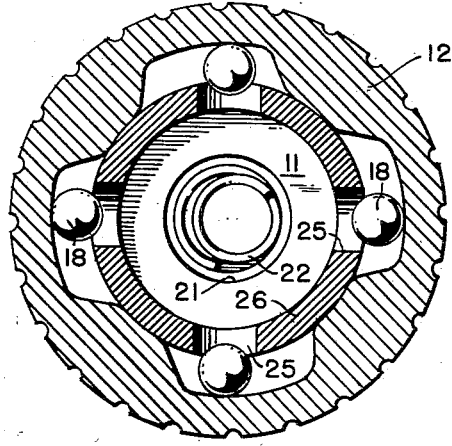

United States Patent Office 2,850,317
Patented Sept. 2, 1958

2,850,317

AUTOMATICALLY RELEASING SWIVEL COUPLING

James M. Munro, Wickford, R. I., assignor to the United States of America as represented by the Secretary of the Navy Application May 7, 1953, Serial No. 353,693

3 Claims. (Cl. 294—83)

(Granted under Title 35, U. S. Code (1952), sec. 266)

The invention described herein may be manufactured and used by or for the Government of the United States of America for governmental purposes without the payment of any royalties thereon or therefor.

This invention relates to swivel couplings, and particularly (although not exclusively) to apparatus for coupling a parachute to a weapon or other article, or bundle of articles, preparatory to dropping such material from an aircraft.

An object of the invention is to provide, in a coupling of the character described, retaining means including parts normally interlocked against relative rotation for maintaining a positive locking grip upon a latch element attached to the load to be dropped.

A second obejct of the invention is to provide, in combination with such normally interlocked rotatable parts, means facilitating free rotation of said interlocked parts, as a unit, throughout the duration of the descent from aircraft to ground, or from aircraft to water surface.

A third object is to provide, in combination with such normally interlocked parts, means operated by the impact reaction to produce relative rotation between such parts and thereby to release the coupling from the load, automatically, when the load strikes a ground or water surface.

A fourth object is to provide, in combination with a load-attached latch element of the character indicated, coupling means normally gripping said latch element and so related thereto that the complete coupling assembly is separated from the load-attached latch element upon impact with the surface, thus relieving the dropped load of all extraneous weight other than the weight of the latch itself.

The prior art includes a number of load-releasing couplings employing ball-and-recess types of iinterlocks; but most if not all of such prior couplings rely upon axially directed forces to push the locking ball, or balls, in a direction parallel to the longitudinal axis of the coupling, for release of the load. The coupling of the present invention, on the other hand, involves a different concept, namely, the concept of applying a force transversely of the coupling to cause peripheral travel of a ball-engaging rotatable element, and thereby to free the coupling from its load. This novel concept of applying peripherally directed rotational force for release of the ball-and-recess interlock, in lieu of axially directed releasing force, provides for greater certainty of correct and precise functioning of the apparatus, both as to its gripping function and as to its releasing function.

Accordingly, a fifth object of the invention is to provide, in a coupling of the character indicated, means for applying a rotational force for coupling release purposes, thereby rendering the releasing action more positive and certain.

Other objects and many of the attendant advantages of this invention will be readily appreciated as the same becomes better understood by reference to the following detailed description when considered in connection with the accompanying drawings wherein:

Fig. 3 is a perspective view of the complete assembly of Fig. 1;

Fig. 4 is a perspective view of the inner portion of the complete assembly;

Fig. 5 is another subassembly view; and

Figure 1:
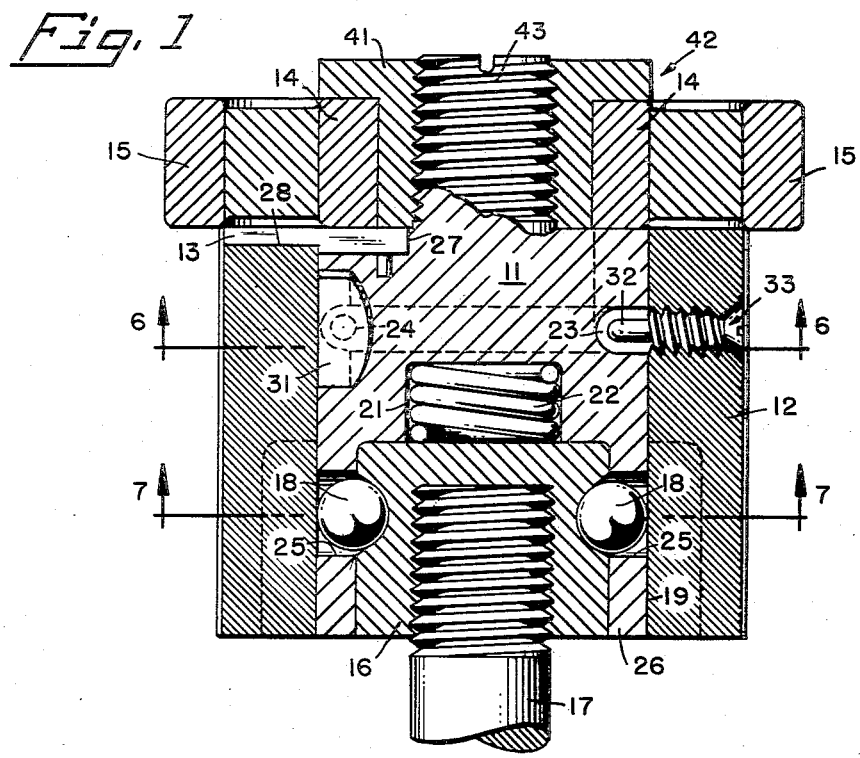
Fig. 1 is a longitudinal sectional view of a device embodying the invention.
Figure 2:
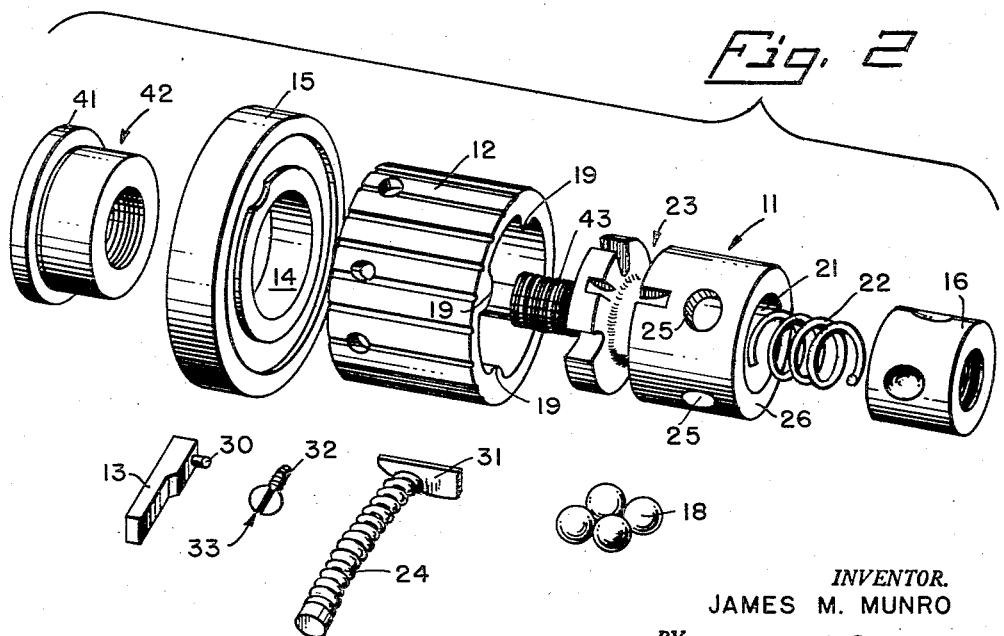
Fig. 2 is an exploded perspective view of the parts comprising the device of Fig. 1.

Figs. 6 and 7 are transverse sectional views along lines 6—6 and 7—7, respectively, of Fig. 1.

In these various views reference numerals 11 and 12 (referred to in the claims as second and third members, respectively) designate concentric cylindrical parts normally interlocked (as by radially disposed key 13) for rotation in unison with the inner race 14 of a bearing assembly whose outer race 15 is attachable to the shroud ring and converging shroud lines (not shown) of a parachute designed to serve as the descent retarding means during descent of a weapon or other load dropped from an aircraft.

Cup-shaped member 16 (referred to in the claims as a first member) is internally threaded to attach to the threaded end of a post 17 extending from the suspension frame, or sling, surrounding the load to be dropped; the member 16 thus constituting one example of the "latch element" above referred to.

As shown, the cup-shaped member 16 has four semispherical recesses at equal intervals about its periphery, into which are received the latch retaining balls 18 which normally register with lands 19 spaced equally about the inner periphery of the outer element 12 of the pair of concentric, normally interlocked cylindrical parts 11 and 12 above referred to. Inner part 11 is of generally solid construction, except for a centrally disposed pocket 21 receiving a coiled compression spring 22, a peripheral groove 23 receiving a second coiled spring 24, a series of circular holes 25 spaced equally about the circumference of the skirt portion 26, and a radially disposed slot 27 adapted to register with a similiar slot 28 on the upper surface of the outer cylindrical part 12, hereinafter referred to as the cam sleeve. The peripheral groove 23 is intersected, at one point (see Fig. 4) by a short straight slot into which is inserted a thin plate 31 serving as an abutment for one end of spring 24, the other end of the spring abutting the inner end 32 of a screw 33 passing radially through the sleeve 12.

The peripheral spacing of the two abutments 31 and 32 is such that the coiled spring 24 is compressed therebetween so long as the two major cylindrical parts (core 11 and cam sleeve 12) are in their normal interlocked relationship, with radial key 13 locking the said two parts against relative rotation by virtue of its registry with the aligned slots 27 and 28 of the core and sleeve, respectively; the key being equipped with a catch-pin 30 for engagement with a depression in core 11, to prevent outward drift of the key. It is to be noted that the inner end 32 of the screw 33 is reduced such that space is thereby provided in the peripheral groove 23 for downward bodily movement of cam sleeve 12 to disengage slot 28 from key 13.

In this interlocked condition of the parts 11 and 12, the skirt portion 26 of the core 11 serves to retain the balls 18 in registry with the lands 19 of the cam sleeve 12 on the one hand, and in registry with the semispherical recesses of the latch element 16 on the other. Thus, the skirt portion 26 of the core is in effect a ball cage cooperating with balls 18 to establish a three-element interlock embracing the parts 11, 12 and 16 and thereby maintaining a positive grip upon the load being carried by the load fixture post 17.

This positive gripping action is not in any degree diminished by stresses or shocks occurring during descent of the load toward the surface of the ground or water, for any such stresses or shocks (such as the shock due to parachute opening) merely serve to increase the longitudinally acting tension, between the latch 16 and core 11. Referring to Fig. 1 it will be apparent that an upward force, such as would be applied upon parachute opening, causes the lower surfaces of holes 25 to engage the balls and tend to move them upwardly. This produces forces between balls 18 and the semi-spherical recesses which tend to cam the balls radially outwardly which applies a frictional force against lands 19 which prevents member 12 from moving axially in response to downwardly directed inertia forces applied to it by reason of the parachute opening or shock. During such descent the parachute shroud ring is retained by reason of its attachment to the outer race 15 of the bearing assembly; the bearing assembly being in turn retained on the coupling assembly by action of the flange 41 on nut 42, the latter being threaded to shank 43 of the core 11. This arrangement permits "free-wheeling" between the parachute ring, on the one hand, and the load suspended from the coupling, on the other; thus, much of the shock and stress arising during descent of the load is absorbed in relative rotation of the inner and outer races of the bearing assembly instead of being transmitted throughout the coupling. The result is a greater stability of the apparatus as a whole.

Upon impact between the descending load and the surface of the ground, or water, the sudden checking of further axial motion of core 11 (and key 13) in conjunction with the lack of such immediate check upon the cam sleeve 12, permits said cam sleeve 12 to move axially forward by inertia, thus freeing its radial slot 28 from the restraint of key 13. Thereupon compressed spring 24 expands, exerting a turning effort on cam sleeve 12, by way of screw 33, and thereby angularly shifting lands 19 away from balls 18. The balls 18 thereupon move radially outward, to the positions indicated in Fig. 7, in which positions they are completely free of the recesses of latch 16. The parachute and coupling assembly are then quickly separated from the latch and its attached load by the snap-action of ejector spring 22, as the latter expands in both axial directions simultaneously. Thus, all of the weight of the coupling is removed from the load, with only the weight of latch 16 and post 17 remaining. The buoyancy of the load is thus greater than in certain prior devices wherein a major part, or all, of the coupling mechanism remains attached to the load. This is an important factor if the load is intended for delivery upon a water surface.

Also in contrast with the mode of operation of certain prior devices, the present invention's mode of operation involves utilization of rotational forces acting suddenly and positively (the expansion of spring 24 in a peripheral direction, in the illustrated embodiment) to free the locking balls 18, rather than relying upon axially directed forces, as do such prior devices.

Since these rotational forces are exerted in a plane that is normal to the axis of operation of the impact forces, the ball releasing action is relatively independent of such impact forces, hence more certain, positive, and consistent in its functioning. Also, for the same reason, there is much less possibility of a relocking of the balls to the latch, than in prior devices wherein such relocking frequently occur, due to reliance upon axially directed force exclusively.

Obviously many modifications and variations of the present invention are possible in the light of the above teachings. It is therefore to be understood that within the scope of the appended claims the invention may be practiced otherwise than as specifically described.

What is claimed is:

1. Apparatus for releasably securing a parachute to an air dropped missile, comprising: a first member adapted to be secured to the missile, said member having a cylindrical periphery with a plurality of angularly spaced semi-sperical recesses disposed in the same plane, a second member having a tubular skirt portion at one end thereof telescopically disposed around said first member and having a plurality of angularly spaced holes extending through the wall of same and in radial alignment with said recesses, a ball disposed partly within each recess and its mating hole in the skirt portion, a third member telescopically disposed around the second member, adapted to move axially relative to the first and second members under influence of inertia and having angularly spaced land portions engaging the balls and preventing outward radial movement of same to thereby lock said first and second members against separation, said third member having angularly spaced recesses disposed between the land portions into which the balls may move when the third member is rotated relative to the first and second members, a spring for effecting the rotation aforesaid, means locking said third member against rotation, said third member adapted to disengage from the locking means upon axial movement of same relative to the first and second members when the missile impacts the surface of the water to thereby permit said spring to rotate the third member to a position wherein the balls may disengage said semi-spherical recesses and move into the angularly spacer recesses in the third member and condition the first member for separation from the remainder of the apparatus.

2. Apparatus in accordance with claim 1 including a compressed coil spring disposed between the first and second members and urging them in a direction to separate from each other.

3. Apparatus in accordance with claim 1 wherein said spring comprises a coil compression spring disposed in a circumferentially extending recess disposed in the periphery of the second member, one end of the spring abutting an abutment on the second member and the other end abutting an abutment on the third member.

References Cited in the file of this patent

UNITED STATES PATENTS

| | | |
|---|---|---|
| 2,420,746 | Heidman et al. | May 20, 1947 |
| 2,435,444 | Johnson | Feb. 3, 1948 |
| 2,693,980 | Herdman, Jr. | Nov. 9, 1954 |
| 2,723,876 | Langlois et al. | Nov. 15, 1955 |